United States Patent [19]

Wenzlaff et al.

[11] Patent Number: 5,203,969

[45] Date of Patent: * Apr. 20, 1993

[54] METHOD OF SEPARATING AND RECOVERING COMPONENTS OF MIXTURES VIA PERVAPORIZATION

[75] Inventors: Axel Wenzlaff, Escheburg; Dieter Behling, Hamburg; Karl W. Böddeker, Beitenfelde, all of Fed. Rep. of Germany

[73] Assignee: GKSS-Forschungszentrum Geesthacht GmbH, Geesthacht, Fed. Rep. of Germany

[*] Notice: The portion of the term of this patent subsequent to Apr. 28, 2009 has been disclaimed.

[21] Appl. No.: 772,932

[22] Filed: Oct. 7, 1991

Related U.S. Application Data

[63] Continuation of Ser. No. 484,076, Feb. 23, 1990, Pat. No. 5,108,549.

[30] Foreign Application Priority Data

Feb. 25, 1989 [DE] Fed. Rep. of Germany ....... 3905924

[51] Int. Cl.$^5$ .............. B01D 3/10; B01D 3/42; B01D 61/36; B01D 71/06
[52] U.S. Cl. ............... 203/1; 159/DIG. 10; 159/DIG. 16; 159/DIG. 27; 159/47.1; 203/2; 203/3; 203/14; 203/94; 203/98; 203/DIG. 9; 210/637; 210/640; 210/641; 210/804; 210/DIG. 5
[58] Field of Search ........ 203/1, 2, 3, 14, 94, 203/DIG. 9, 98; 159/47.1, DIG. 27, DIG. 16, DIG. 10; 210/804, 640, 637, 641, DIG. 5, 500.27; 202/160, 205

[56] References Cited

U.S. PATENT DOCUMENTS

| | | | |
|---|---|---|---|
| 3,923,650 | 12/1975 | Howe | 210/655 |
| 4,311,594 | 1/1982 | Perry | 210/640 |
| 4,405,409 | 9/1983 | Tusel et al. | 203/19 |
| 4,719,016 | 1/1988 | Storkebaum et al. | 210/416.1 |
| 4,806,245 | 2/1989 | Böddeker | 210/640 |
| 4,875,980 | 10/1989 | Arita et al. | 203/19 |
| 4,877,533 | 10/1989 | Meldrum et al. | 203/19 |
| 4,895,989 | 1/1990 | Sander et al. | 202/197 |
| 4,900,402 | 2/1990 | Kaschemekat et al. | 203/19 |
| 4,936,954 | 6/1990 | Sander | 202/186 |

FOREIGN PATENT DOCUMENTS

| | | | |
|---|---|---|---|
| 0334547 | 9/1989 | European Pat. Off. | 210/640 |
| 3447615 | 7/1985 | Fed. Rep. of Germany | 203/19 |
| 1207101 | 8/1989 | Japan | 210/640 |

OTHER PUBLICATIONS

Robert Rautenbach und Ingo Janisch, *Membranverfahren in der Umwelttechnik*, "Übersichtsbeiträge", 1987, pp. 187–196.

*Primary Examiner*—Virginia Manoharan
*Attorney, Agent, or Firm*—Robert W. Becker & Associates

[57] ABSTRACT

A method of separating and recovering components of a mixture having a gap in the range of miscibility and having organic compounds and water in a pervaporization process with the aid of membranes. The mixture is first separated into an organically loaded water phase and a water-saturated organic phase. Subsequently, the organically loaded water phase and the water-saturated organic phase are separately subjected to parallel, different pervaporization processes, resulting in retentates as water on the one hand and organic liquid on the other hand. The permeates that result during the pervaporization processes are subsequently returned to the mixture that is to be separated.

16 Claims, 3 Drawing Sheets

METHOD OF SEPARATING AND RECOVERING COMPONENTS OF MIXTURES VIA PERVAPORIZATION

This application is a continuation of application Ser. No. 484,076 filed Feb. 23, 1990, now U.S. Pat. No. 5,108,549 issued Apr. 28, 1992.

BACKGROUND OF THE INVENTION

The present invention relates to a method of separating and recovering components of organic compounds in water in a pervaporization process with the aid of membranes.

Mixtures of this type comprise, for example, organic compounds that are completely or partially saturated with water and are only partially water soluble, and which in addition contain water phases that are loaded with organic compounds, including emulsions, that are only slightly soluble therein. Mixtures of this type are formed, for example, as bottom sludge in fuel depots in oil and solvent traps of waste water conduits, during various processes in the chemical industry, as reaction products during synthesis, in the circulation fluid of closed circuit fluid vacuum pumps, during high pressure or ultrasonic cleaning, during the cleaning of stationary and moving tanks, and during salvaging of liquids from tankers or similar vehicles that have been damaged or have been involved in an accident on water or on land.

In general, the desire is to remove the organic chemical compounds from the mixture, whereby on the one hand water having a high degree of purity and on the other hand the organic compounds having a high degree of purity are to be separated, so that the water can be supplied as usable water having an unlimited use, and the recovered organic compounds can be supplied for reuse for technical or commercial purposes.

The organic chemicals that are to be treated pursuant to the present invention include those having a low water solubility, i.e. aliphatic and aromatic hydrocarbons such as hexane, toluene or mixtures of these groups such as fuels for internal combustion engines; solvents having a limited water solubility, such as higher alcohols, esters, ketones, to the extent that they have a limited water solubility; ether; and other basic materials of organic chemistry, as well as of polymer chemistry, such as styrene.

The treatment of such mixtures is generally effected by separating the mixtures into a water phase, which is organically saturated, and into the organic phase, which is water saturated, whereby the separation process is itself effected by a settling or centrifuging process. Pursuant to the heretofore known state of the art, the further processing of these phases, which cannot be used in this condition, is effected in various ways. For example, the organic compounds can have water removed therefrom via distillation, extraction, sorption, or tractive-medium distillation, whereby generally further by-products result that in turn must be removed or otherwise treated; this is a significant drawback. In situations where it is particularly difficult to recover components, such mixtures are therefore pyrolytically or via high temperature combustion in special furnaces, converted, i.e. reduced, into secondary products that are to be handled. The water phase is similarly purified at high costs in the same process in separate units, or the concentration of the dissolved organic compounds is reduced by dilution with other waste water and is discharged in small quantities into the waste water system or, in the case of tanker ships, is pumped out into the sea. Due to the high ecological incompatibility, this latter method of removal will in the future be precluded by regulations.

It is fundamentally also known to carry out separations of this type via a pervaporization process with the aid of membranes. For example, U.S. Pat. No. 4,405,409 discloses the separation of organic liquids with the aid of distillation followed by pervaporization with the aid of membranes. In this connection, water as distillation sump is given off and the organic compounds from which water has been removed are removed as a product of the membrane pervaporization stages.

With another known separation process, for example pursuant to Rautenbach and Janisch (Chem.-Ing.-Technik 59 (1987) No. 3, pp. 187-196), a method is described where a mixture of materials is separated via reverse osmosis in combination with pervaporization. Due to the high osmotic pressures, however, here also limits are placed on the water purification that cannot be overcome, so that the remaining residual quantity of solvent in the water is greater than 2,000 ppm. A further drawback of this heretofore known method is the completely different technical manner of operation of the thus combined processes, because the reverse osmosis operates at lower temperatures and extremely high pressure, whereas the pervaporization is a thermal process with vacuum evaporation on the back side of the membranes.

By way of explanation, pervaporization is a treatment or separation process for liquid mixtures. The mixtures that are to be separated are conveyed onto membranes that are largely impermeable to liquids; however, vapors can pass through the membranes in a controlled manner. A partial pressure is generally applied to the back side of the membranes in order to immediately withdraw vapors that pass through the membranes and to extract them as liquids at a condenser. However, it is also possible to withdraw the arriving vapors with the aid of a rinsing gas and to condense them at a condenser. Since the membranes are generally made of plastic, and the throughput capacity can be increased by reducing the thickness of the membranes, these very thin flexible sheets must be expediently secured or installed in special devices (pervaporization apparatus).

As indicated above, up to now liquid measures were predominantly separated by distillation. Unfortunately, with a number of mixtures, such as water/ethanol, chloroform/hexane, ethanol/cyclohexane, butanol/heptane, water/isopropanol, water/tetrahydrofuran, water/dioxane, methanol/acetone methanol/benzene ethanol/ethylacetate, and methanol/methylacetate, a concentration is often obtained that vaporizes azeotropically, i.e. produces a mixture that cannot be further separated in this form. This situation cannot be improved by the addition of further materials, whereby the treatment steps must then be continued by extractive distillation, which, of course, is associated with a considerable expense.

Pervaporization offers an alternative approach. With such a process, one of the two components is preferably absorbed by a membrane. The membrane, which is continuously supplied on the feed side with the mixture, is continuously discharged on the back side via the application of a vacuum, with the absorbed or adsorbed liquid being removed from the membrane as vapor, thereby making space for more liquid that is to be absorbed. Thus, by selecting suitable membranes, even azeotropic mixtures can be split up into their components.

This is the basis of the present invention, an object of which is to provide a method of separating and recovering the components of mixtures comprising organic compounds and water and having gaps in the range of miscibility, whereby with the inventive method not only the water but also the organic substances can be provided with such a high degree of purity that the impurities that remain are in each case less than 10 ppm.

BRIEF DESCRIPTION OF THE DRAWINGS

This object, and other objects and advantages of the present invention, will appear more clearly from the following specification in conjunction with the accompanying examples and schematic drawings, in which.

SUMMARY OF THE INVENTION

Figure 1:
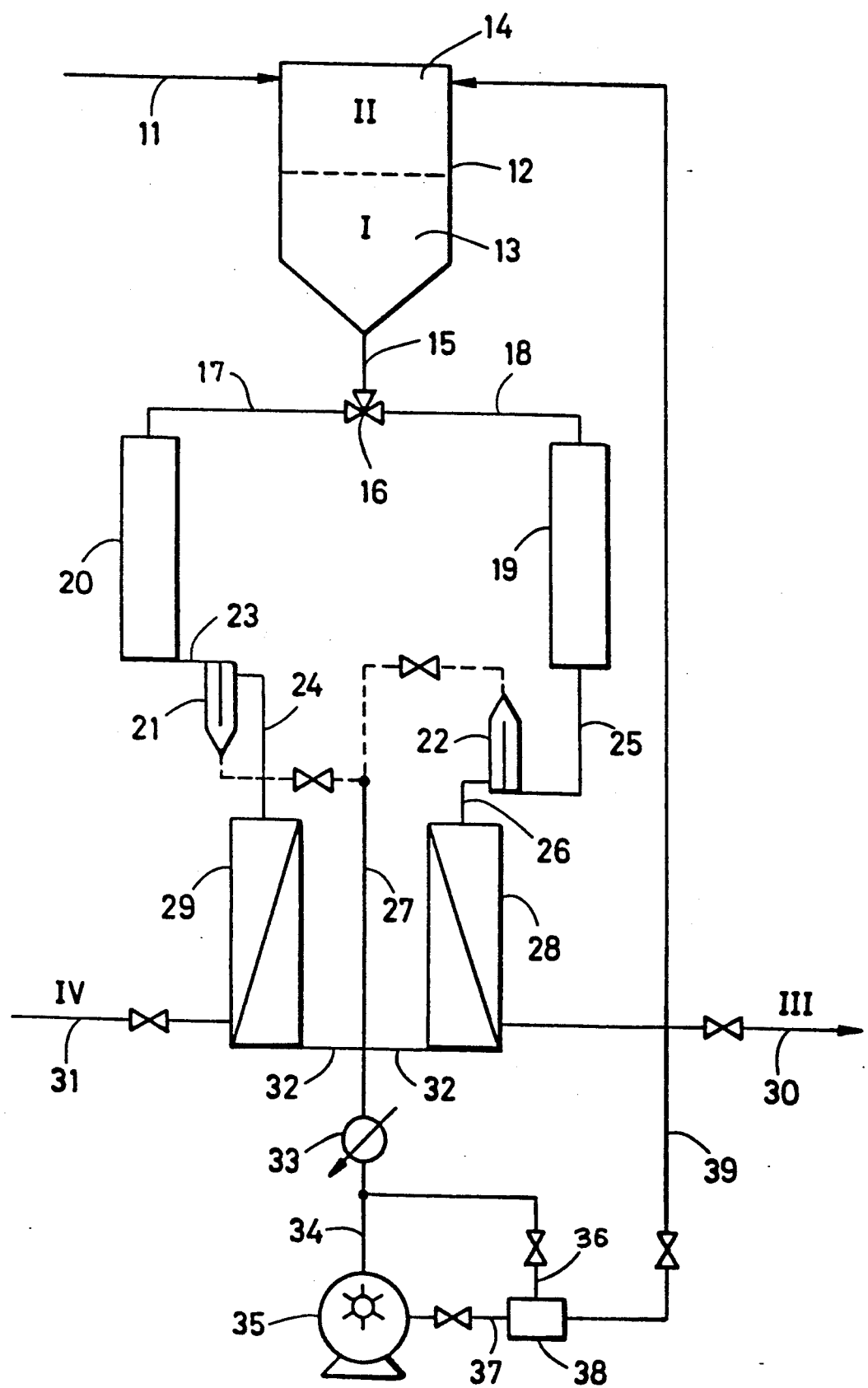
FIG. 1 shows the basic configuration of one exemplary installation for carrying out the inventive method.

The method of the present invention is characterized primarily by the steps of: a) first separating the mixture into an organically loaded water phase I and a water-saturated organic phase II; b) subsequently separately subjecting the organically loaded water phase I and the water-saturated organic phase II to parallel, different pervaporization processes, whereby permeates result, and whereby from the organically loaded water phase I also a retentate as water III is generated, and from the water-saturated organic phase II a retentate as organic liquid IV is generated; and c) returning the permeates that result during the pervaporization processes to the mixture that is to be separated.

The advantage of the inventive method is essentially that the process for separating and recovering the components from the mixtures is effected exclusively via pervaporization, with expensive further processes, which often cannot be combined with one another without special measures, being completely eliminated. A further advantage of the inventive method is that the entire process can be undertaken at low temperatures, i.e. at temperatures below the boiling point of the materials that are involved, so that pressures above the normal pressure are not required for carrying out the inventive method. Finally, another advantage of the inventive method is that the retentates that are produced with this method, i.e. the usable products of the method, are produced at the desired degree of purity so that subsequent cleaning steps, as were heretofore necessary, are now superfluous.

Finally, pursuant to the inventive method, the permeates, i.e. the changed component mixtures that pass through the membranes as the pervaporization process is carried out, are returned to the mixture that is to be separated, so that these component mixtures are again supplied, in the manner of a cyclical process, together with the mixture that is supplied to the process from the outside.

Pursuant to one advantageous specific embodiment of the inventive method, after the separation of the mixture into an organically loaded water phase and into a water-saturated organic phase, these phases are first separately subjected to parallel separation processes, which can be accomplished, for example, by conveying the two phases to a separator for water and a separator for organic compounds, whereby in these separators subsequently escaping water, or water that is carried along due to an inadequate layer separation, is retained, or serves for the separation of carried-along organic drops that are not dissolved.

The separation processes can advantageously be carried out via the force of gravity and/or a coalescer, whereby it is similarly advantageous that the permeates that result during the separation processes, as well as the permeates that leave the actual pervaporization process, be resupplied to the mixture that is to be separated. As a result, a non-interrupted return into the cyclical process takes place.

Pursuant to a further advantageous specific embodiment of the inventive method, prior to the return to the mixture that is to be separated, the permeate or permeates are condensed under vacuum. Fundamentally, in this connection any desired suitable type of condensation can be utilized.

With certain advantageous specific embodiments of the inventive method, where different relationships of the individual product streams of the method are present, it can be expedient to carry out the individual parallel treatment steps, i.e. the pervaporization process for the separation of the water-saturated organic phase and the organically loaded water phase, at different vacuums, since via a method modified in this manner, the method can be adapted far easier to a situation where one group of materials has a far greater quantity than does a smaller group of materials.

Pursuant to one embodiment of the inventive method, the permeates of both phases are preferably mixed prior to the condensation, so that ultimately only a single condensation apparatus has to be provided. However, it is in principle also possible to provide separate condensation apparatus for the permeate coming from the water-saturated organic phase and for the permeate coming from the organically loaded water phase. This latter situation is particularly important if the ability of the permeates to condense differs, and if the efficiency characteristics of the membranes that are used require a different vacuum for the two parallel pervaporization processes. However, in all situations it is less expensive and more complex to combine the two permeates that are coming from the different pervaporization processes and to operate a single condensation and vacuum system.

Prior to being conveyed to the mixture that is to be separated, the condensed permeates are advantageously collected together so that these permeates, which comprise water and organic materials again dissolve partially in one another and separate into two phases, one comprising organic material that is saturated with water, and the other being concentrated with organic material up to the limit of solubility. The collected permeate is then advantageously continuously or periodically supplied to the mixture that is to be separated pursuant to the inventive method.

The untreated mixture, i.e. the mixture that is supplied for separation pursuant to the inventive method, is advantageously separated via the force of gravity into the organically loaded water phase and the water-saturated organic phase, whereby this way of carrying out the method is normally more economical than any other separation method.

Pursuant to a different advantageous specific embodiment of the inventive method, the mixture is separated via a centrifuging process or via a coalescer into the organically loaded water phase and the water-saturated organic phase, with this variant of the method being selected if the mixture that is to be separated is an emulsion or tends to form an emulsion.

The entire method can advantageously be carried out automatically if the permeate fractions contained in the retentate are cyclically automatically analyzed to determine a standard value, whereby as a function of the standard value that is determined, the feed velocity of the organically loaded water phase and of the water-saturated organic phase to the respective pervaporization processes are regulated.

In order in a simple manner to also be able to satisfy the greatest demands relative to environmental protection via the inventive method, it is advantageously proposed, where liquid permeate fractions are automatically detected immediately after leaving the pervaporization processes, to automatically at least interrupt the method sequence, which can also be advantageously applicable, where a nontypical pressure is detected on the permeate side of the pervaporization processes, to at least partially automatically interrupt the sequence of the method.

Further specific features of the present invention will be described in detail subsequently.

DESCRIPTION OF PREFERRED EMBODIMENTS

Referring now to the drawings in detail, the construction of the illustrated installation, via which the inventive method is typically carried out, will first be fundamentally described to provide for a better understanding of the operation of the inventive method.

Figure 2:
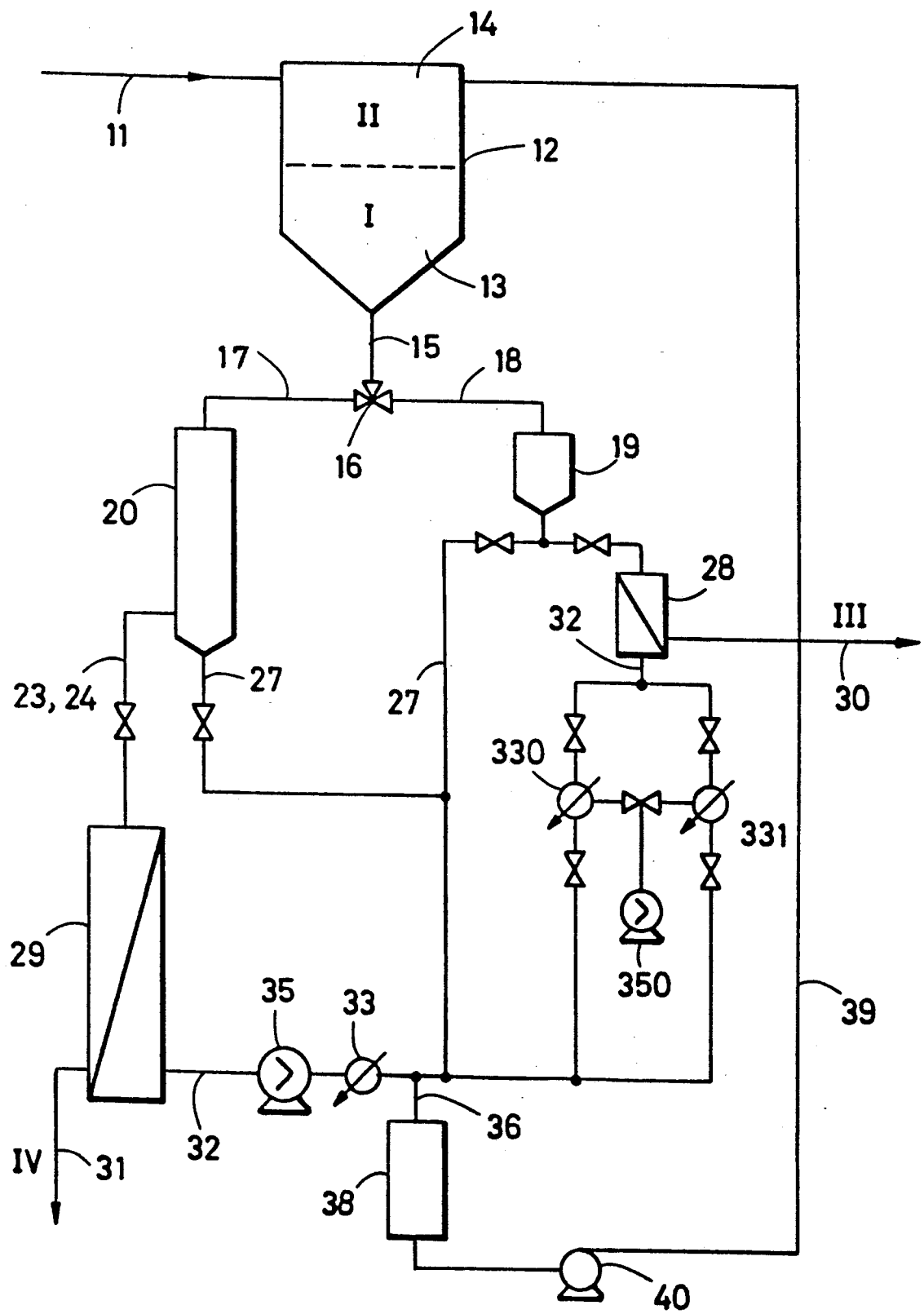
FIG. 2 shows a modification of the installation of FIG. 1 having combined pressure and vacuum condensation.

A mixture 11, which is freed of solid contaminants, for example by filtration, sedimentation, or in some other suitable manner, is conveyed to a phase separation tank 12 (see FIGS. 1 and 2). In this tank, pursuant to method step "a" a layer separation of the mixture 11, which comprises materials that are soluble with one another to only a limited extent, is effected. The separation of the mixture into an organically loaded water phase I, 13 and into a water-saturated organic phase II, 14 is effected automatically due to gravity. The aqueous phase I, 13 contains organic components that are dissolved in a saturation concentration; the organic phase II, 14 is saturated with water. Via a line 15, and a three-way valve 16 that is disposed downstream therefrom, the organically loaded water phase I, 13 is first conveyed via the line 18 to a storage tank 19; subsequently, by shifting the three-way valve 16, the water-saturated organic phase II, 14 is conveyed via the line 17 to the storage tank 20. The settling tank 12 is then ready to again accommodate the mixture 11 that is to be separated.

A constant liquid stream, which is regulated in any suitable manner, is conveyed from the storage tank 20, via a water separator 21, to the pervaporization apparatus 29. Water that has subsequently escaped, or water that has been carried along in the storage tank 20 as a consequence of an inadequate layer separation in the phase separation tank 12, is retained in the separator 21.

The pervaporization apparatus 29 is equipped with membranes that can absorb or adsorb water and can extract this water from the organic liquid that flows over the membranes. At the same time, entry of organic components, which cannot be prevented in every case, also occurs into the membrane; however, this organic fraction can be suppressed to a relatively low value by selecting suitable membranes, so that the organic liquid IV leaves the pervaporization apparatus 29, via the retentate discharge line 31, in the desired (low proportion of water) form. The surface of the membrane in the pervaporization apparatus 29 is designed in such a way that the organic liquid complies with the purity requirements of a commercial product of this type, i.e. adheres to the requirements regarding residual water content for a return to a chemical process.

The permeate side of the pervaporization apparatus 29 is connected via a line 22 with a condenser 33, the back side of which is in turn connected via a line 34 to a vacuum pump 35. By applying a vacuum to the permeate chamber of the pervaporization apparatus 29, the water that is received by the membranes, as well as the undesired, accompanying organic fractions that enter the membranes, are conveyed by evaporation on the back side into the permeate chamber and pass via the condenser 33 into a collector tank 38.

The organically loaded water phase I, 13 that is disposed in the storage tank 19 is handled in a manner similar to the water-saturated phase II, 14 that is disposed in the storage tank 20. To separate non-dissolved, suspended organic drops that are carried along, the organically loaded water phase I, 13 passes through the separator 22, which is designed as a lubricant, fuel, or solvent trap; the separator 22 is generally a so-called gravity separator or coalescer. The stream of water leaving the separator 22 via the line 26 then contains only dissolved quantities of organic substances and in this form enters the pervaporization apparatus 28. In this apparatus, the liquid is conveyed over membranes that primarily take up organic liquids, although here also a simultaneous receipt of relatively small quantities of water by the membrane cannot be entirely prevented. However, here also this undesired effect can be reduced to a value that is advantageous to the method by a suitable selection of the membranes.

After leaving the basically computable membrane flow-over surface in the pervaporization apparatus 28, the retentate III water has the desired purity, with the degree of purity being adapted to be adjusted in conformity with the membrane parameters.

The permeate side of the pervaporization apparatus 28 is again connected via the line 32, the condenser 33, and the line S4 to the vacuum pump S5. In other words, the permeate is conveyed to the collector tank 38 via the line 36 by means of continuous evaporation with the aid of the vacuum pump 35 and condensation.

In relation to the product streams of the inventive method, i.e. the water III recovered via the retentate discharge line 30, and the organic liquid IV recovered via the retentate discharge line 31, the permeate quantities that are produced in the installation as a whole and are collected in the tank 38 are small, typically being significantly less than 10%, and, depending upon the purity requirement and the type of mixture 11 that is to be separated, even being less than 1%. The permeate that Is collected in the tank 38 is continuously or periodically returned to the settling tank 12 via the line 39 for further treatment or separation, thereby closing the cyclical process.

An important and very advantageous characteristic of the inventive method is that no byproducts are formed, as is generally the case with distillation sumps, and no additional materials are introduced into the process, the removal of which presents further problems, as is typical for example with the known extraction processes and absorption processes. A special feature of the inventive method is also the very advantageous possibility of already being able to carry out this method at room temperature. This is particularly significant with materials that at higher temperatures undergo immediate transformations, such as styrene, which readily undergoes polymerization if heat is supplied and/or oxygen is supplied.

In the embodiment illustrated in FIG. 2, the parts of the installation that are the same as with the embodiment of FIG. 1 have the same reference numerals. However, in contrast to the embodiment of FIG. 1, in the embodiment of FIG. 2 the parallel units for separating the organically loaded water phase I and the water-saturated organic phase II are embodied as alternating units, each of which is provided with its own condenser system 33; 330 (331), and each of which is equipped with its own vacuum pump 35; 350. Such an installation is used in particular if, for example, the quantity of one group of materials (organic components) is much greater than the other group of materials (water phase). Such a construction of the installation for carrying out the inventive method is selected if the ability of the permeates evaporated at the end of the pervaporization apparatus 28, 29 to condense is different, and the performance characteristic of the membranes of the parallel processes that are utilized requires a different vacuum.

As with the installation of FIG. 1, also with the installation of FIG. 2 the important control parameters of the method, in addition to the selection of the membrane, are the operating temperature, the operating vacuum, and the condensation temperature. The basic operating principle of the installation of FIG. 2 is the same as that of the installation of FIG. 1. However, the storage tank 20 that contains the organically loaded water phase I, as well as the portion of the installation that follows, are several times larger than the storage tank 19 that is provided for the water-saturated organic phase II. This is always expedient if the water-saturated organic phase II is the considerably greater amount or in comparison to the organically dissolved portion in the water phase has a very high water content. From time to time, subsequently escaping, undissolved water can additionally be discharged via the line 27 in the installation of FIG. 2 from the sump of the storage tank 20 into the collector tank 38.

In principle, the portion of the installation for the organically loaded water phase operates identically to that of the installation illustrated in FIG. 1.

If the organic components of the water-saturated organic phase cannot be very easily evaporated or are highly toxic materials, a condensation variant using freezing technology can be selected, with the two condensers 330, 331 provided therefor being supplied with cooling agents. Since the permeate vapors that exit the pervaporization apparatus 28 at the line 32 partially freeze solidly in the condensers 330, 331, these permeate vapors can be alternately acted upon while at the same time the respective other side is melted and the liquid condensate is withdrawn into the collector tank 38. This requires a series of switching, shutoff, and venting fittings, which are not separately indicated. This form of condensation is required if small quantities of highly toxic materials are involved that cannot be allowed to pass into the air via the discharge side of the vacuum pump. By means of the feed pump disposed at the outlet of the collector tank 38, the permeates that have been collected just as with the specific embodiment illustrated in FIG. 1, are again conveyed via the line 39 to the settling tank 12 to close the cycle.

Figure 3:
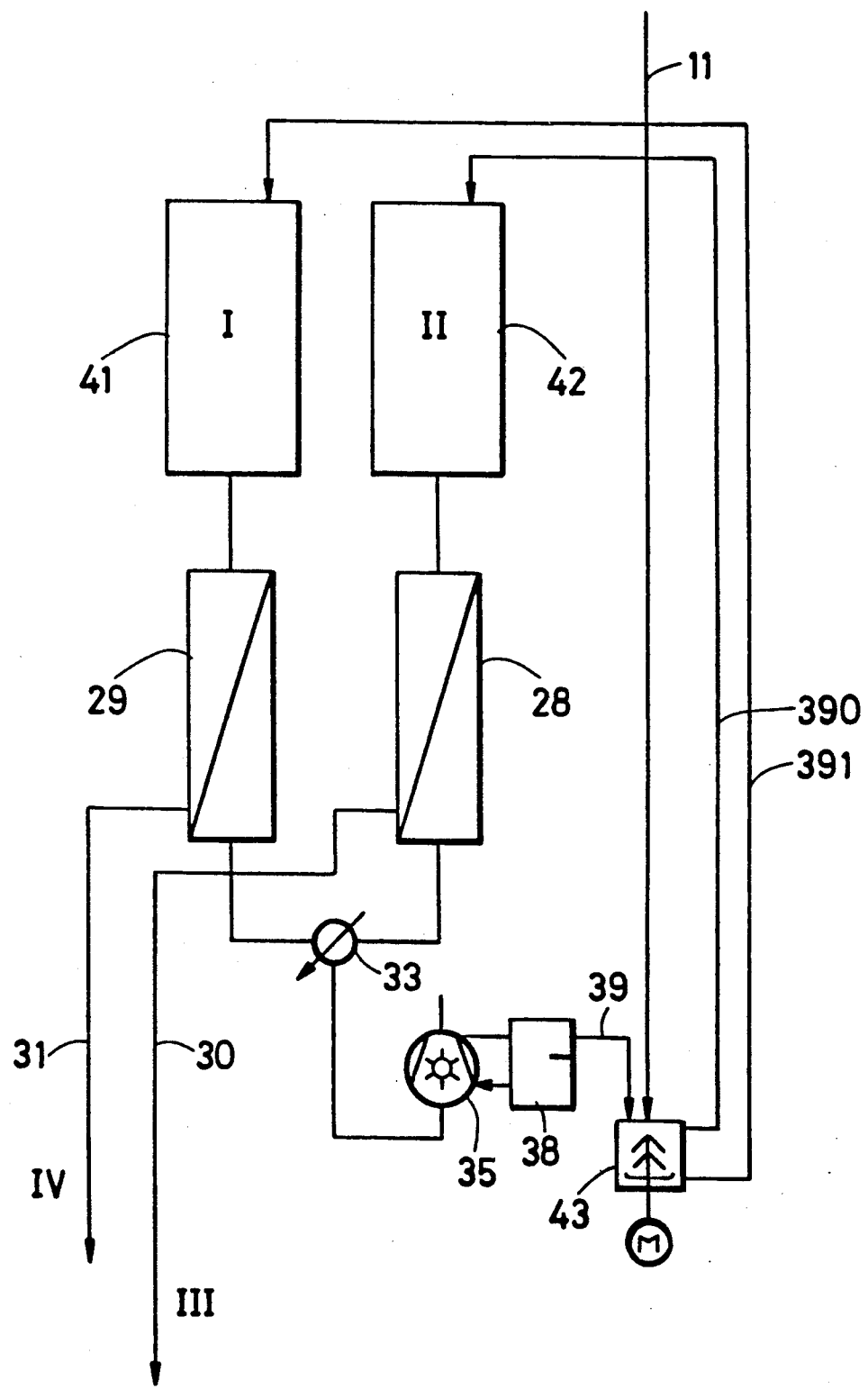
FIG. 3 shows an installation in which the separation of the mixture is effected in a first stage via a centrifuge/coalescer.

In the embodiment illustrated in FIG. 3, parts of the installation that were described in conjunction with the embodiments of FIGS. 1 and 2 have been left off for the sake of simplification. The embodiment of FIG. 3 differs from the two preceding embodiments in that the settling tank 12 in which a first separation step of the mixture 11 that is supplied was achieved by the effect of gravity is omitted. In place of the settling tank 12, a centrifuge or coalescer 43 is provided that undertakes the separation of the mixture 11 into an organically loaded water phase I and water-saturated organic phase II. The modified installation illustrated in FIG. 3 is selected in particular if the untreated mixtures are emulsions or tend to form emulsions. The phases I and II that are separated by the centrifuge or coalescer 43 are conveyed into storage tanks 41, 42, from where they are in turn conveyed into the pervaporization apparatus 28, 29, as was the case in the preceding embodiments.

To generate a vacuum, in the embodiment of FIG. 3 a vacuum pump 35 in the form of a liquid closed-circuit pump is used with which the permeate formed at the condenser 33, accompanied by a mixture with the circuit fluid of the pump (water), passes into a collector tank 38 that at the same time serves as a circuit liquid tank. Due to the continuous flow of the permeate, an overflow results at the collector tank 38 that for further treatment flows via the line 39 into the centrifuge or coalescer 33, from where it is treated in the same way as the mixture 11 that is constantly supplied to the installation.

With all three of the installation variants described in conjunction with FIGS. 1 to 3, in order to protect the environment during disruptions in operation or during loss in efficiency of the membranes, a simple safety disconnect or shutdown is provided in that merely the feed valves to the pervaporization apparatus 28, 29 have to be regulated or closed. By means of analysis signals of the water content of the retentate of the organic phases, it is additionally possible to regulate the supply thereof relative to a set reference value. The organic residual load of water is similarly regulated in conformity with the regulating magnitude for the feed to the pervaporization apparatus 28 that is provided therefor. Thus, for example, density resonators, differential refractometers, or similar devices, as signal emitters, can reliably control the process that takes place in the installation. Where the membrane becomes damaged or fails, float switches can be effective that are disposed at a low spot of the permeate chamber of the pervaporization apparatus 28, 29, and that when liquid flows through immediately close appropriate regulating valves for the feed of the phases I, II, while the contents of the membrane chambers can still be drawn into the collector tank 38 without difficulty. The same function can be assumed by pressure gauges in the permeate chamber that upon increase in pressure close off the feed means to the pervaporization apparatus 28, 29.

In summary, it should be noted that the very simple safety precautions and uncomplicated emergency shutoff devices and measures that are possible pursuant to the present invention are not possible with the heretofore known hybrid techniques using distillation or reverse osmosis or even more complicated systems, even in combination with pervaporization processes.

Examples for providing parallel modular apparatus with membranes:

Examples for providing parallel modular apparatus with membranes: Removal of water from the organic phase:

| Membrane Type | suitability for removal of water |
|---|---|
| Polyethylene carboxylate membranes | not with naphthenes and aliphatics |
| Polyethylene sulfonic acid membranes | not with naphthenes and aliphatics |
| Acetyl cellulose membranes | Not with halogen hydrocarbons and ketones; otherwise universally usable |
| Regenerate celluloses | universally usable |
| Ion exchanger membranes (polyelectrolytes) on a base of acrylic acid, divinylbenzene sulfonic acid | not in media that have a solvent effect upon the matrix |
| Perfluorosulfonic acid | not with alcohols |
| Polytertiary amines | not in saponifying media |
| Polyquaternary ammonium salts | not in saponifying media |
| Polyamides | not with halogen hydrocarbons |

Removal of organic components from the water phase:

| Membrane type | suitable for |
|---|---|
| Silicone membranes | aromatics, aliphatics |
| Polyvinylidene fluoride membranes | esters, ketones, ethers |
| Microporous PTFE membranes | mineral oil components, ether-type oils, styrene |
| Polypropylene membranes with or without a microporous structure | olefins, naphthenes |
| Polyvinyl isobutyl ether membranes | carboxylic acids, halogen hydrocarbons |
| Polyether block amide membranes | aromatics, higher alcohols, halogen hydrocarbons |
| Polyeurethane membranes | fluorochlorohydrocarbons, carburetor fuels, kerosene |
| Chlorinated rubber membranes | ketones, esters, aromatics, halogen hydrocarbons |

EXAMPLE OF THE INVENTION METHOD

Cleaning a mixture of tank wash of a chemical tanker

Cleaning a mixture of tank wash of a chemical tanker (mono-styrene transport)

| | |
|---|---|
| Composition of the mixture: | 4% styrene (contains 20 ppm 1,2 Dihydroxi-4-tert.-butylbenzene) 96% water containing 1200 ppm dissolved inorganic salts, sodium chloride plus hardening constituent |
| Quantity untreated mixture: | 25,000 kg |
| Operating temperatures: | 298 K |
| Processing time: | 24 h |

After moving through the separator, two phases are obtained:

1,000 kg styrene with 400 ppm dissolved water plus 20 ppm 1,2 DHTBB
24,000 kg water phase with 225 ppm styrene plus inorganic salts

| | |
|---|---|
| Membrane type 1 (styrene drying): | Acetyl-Cellulose 2,5 |
| Membrane surface 1: | 6 m$^2$ |
| Membrane type 2 (decontamination of water): | Polyether block amide |
| Membrane surface 2: | 31 m$^2$ |
| Operating vacuum: | less than 5 mBar |
| Internal return via recirculation pump: | 0,7% (corresponding to 7,2 kg/h) |
| Composition of return: | 10,2% styrene 89,8% water |
| Product 1: | 41,67 kg/h styrene with 20 ppm stabilizer (DHTBB) and less than 10 ppm water immediately useable in a process |
| Product 2: | 1,000 kg/h purified water containing less than 10 ppm styrene and 1,200 ppm dissolved inorganic salts satisfies the waste water regulations, and can be immediately discharged or reused |

The present invention is, of course, in now way restricted to the specific disclosure of the specification and drawings, but also encompasses any modifications within the scope of the appended claims.

What we claim is:

1. A method of separating and recovering components of a mixture of organic compounds and water in a pervaporization process with the aid of membranes, said method in operating sequence including the steps of:
    first separating said mixture into an organically loaded water phase I and a water-saturated organic phase II;
    subsequently separately subjecting said water phase I and said organic phase II to parallel, different pervaporization processes, whereby permeates result, and whereby from said water phase I also a retentate as water III is generated and from said organic phase II also a retentate as organic liquid IV is generated;
    condensing said permeates and combining said permeates, wherein the order in which said steps of condensing and combining are performed can be selected as desired; and
    subsequently returning said permeates to said mixture that is to be separated.

2. A method according to claim 1, which includes the step, after said step of separating said mixture into said water phase I and said organic phase II and before said step of separately subjecting said water phase I and said organic phase II to parallel, different pervaporization processes, of then first subjecting said two phases I and II to separate, parallel separation processes.

3. A method according to claim 2, which includes the step of carrying out said separate, parallel separation processes via gravity and coalescence.

4. A method according to claim 2, which includes the step of carrying out said separate, parallel separation processes via coalescence.

5. A method according to claim 2, which includes the step of carrying out said separate, parallel separation processes via gravity.

6. A method according to claim 2, which includes the steps, during said separate, parallel separation processes, of separating out components, with which said water phase I is organically loaded, and water, with which said organic phase II is saturated, and returning said components and said water to said mixture that is to be separated.

7. A method according to claim 1, wherein in said step of condensing at least one of said permeates is condensed to a solid phase.

8. A method according to claim 1, in which said pervaporization processes for the separation of said water phase I and said organic phase II are carried out separately from one another at different vacuums.

9. A method according to claim 1, in which said step of combining is carried out prior to said condensation step.

10. A method according to claim 1, wherein said condensation step is carried out separately for said respective permeates and wherein said step of combining is carried out after said condensation step and prior to said step of returning said permeates to said mixture that is to be separated.

11. A method according to claim 1, further including the step of carrying out said separation of said mixture into said water phase I and said organic phase II via a force of gravity.

12. A method according to claim 1, further including the step of carrying out said separation of said mixture into said water phase I and said organic phase II via a centrifuging process.

13. A method according to claim 1, further including the step of carrying out said separation of said mixture into said water phase I and said organic phase II via a coalescing process.

14. A method according to claim 1, which includes the step of: cyclically automatically analyzing the permeate fractions contained in said water retentate III and organic liquid retentate IV to determine a standard value; and as a function of said standard value regulating the respective feed velocity of said water phase I and said organic phase II to their respective pervaporization process.

15. A method according to claim 1, which includes the step of automatically at least interrupting the operating sequence of said method when liquid permeate fractions are detected immediately after exiting said pervaporization processes.

16. A method according to claim 1, which includes the step of automatically at least partially interrupting the operating sequence of said method when a non-typical pressure, relative to an operating pressure of said pervaporization processes, is detected on the permeate side of said pervaporization processed.

* * * * *